United States Patent [19]
Grant et al.

[11] Patent Number: 5,640,701
[45] Date of Patent: Jun. 17, 1997

[54] METHOD FOR REMEDIATING SOIL CONTAINING RADIOACTIVE CONTAMINANTS

[75] Inventors: David C. Grant, Gibsonia; Edward J. Lahoda, Edgewood Borough; Albert J. Dietrich, Rillton, all of Pa.

[73] Assignee: Westinghouse Electric Corporation, Pittsburgh, Pa.

[21] Appl. No.: 997,076

[22] Filed: Dec. 29, 1992

[51] Int. Cl.[6] .................................................. G21F 9/00
[52] U.S. Cl. ........................... 588/1; 423/17; 423/18; 423/20; 209/2
[58] Field of Search ...................... 588/1; 423/17, 423/18, 20; 209/2

[56] References Cited

U.S. PATENT DOCUMENTS

| | | | |
|---|---|---|---|
| 4,783,253 | 11/1988 | Ayres et al. | 209/2 |
| 5,045,240 | 9/1991 | Skriba et al. | 588/7 |
| 5,128,068 | 7/1992 | Lahoda et al. | 588/1 |
| 5,266,494 | 11/1993 | Lahoda et al. | 436/57 |
| 5,268,128 | 12/1993 | Lahoda et al. | 252/626 |
| 5,316,223 | 5/1994 | Lahoda et al. | 241/24 |
| 5,322,644 | 6/1994 | Dun et al. | 252/626 |
| 5,324,433 | 6/1994 | Grant et al. | 210/634 |

OTHER PUBLICATIONS

J.W. Assink, et al., "Extractive Methods For Soil Decontamination; A General Survey and Review of Operational Treatment Installations," *Contaminated Soil*, pp. 655–667, 1986.

*Primary Examiner*—Ngoclan Mai

[57] ABSTRACT

Soil comprising small soil particles, clay and silt particles, humus, fine vegetation, and contaminated with soluble or insoluble radioactive species is treated by first introducing an aqueous extracting solution comprising a mixture of sodium and potassium carbonate (or bicarbonate), or ammonium carbonate (or bicarbonate) into the soil to solubilize and disperse the radioactive species into solution. The extracting solution has a pH greater than or equal to about 7.5. Contaminated fine vegetation then is separated from the soil and extracting solution. Next, an acid like hydrochloric acid is introduced into the soil. The acid is added in an amount sufficient to lower the pH of the extracting solution at which point desirable organic material will substantially precipitate or coagulate from the extracting solution. The cleansed soil particles, including organic matter, is separated from the contaminated extracting solution. Radioactive species are then removed from the extracting solution, which then may be reused.

35 Claims, 2 Drawing Sheets

5,640,701

METHOD FOR REMEDIATING SOIL CONTAINING RADIOACTIVE CONTAMINANTS

BACKGROUND OF THE INVENTION

This invention relates to a method for remediating soil contaminated with radioactive species. This invention further relates to a method for remediating uranium and radium contaminated soil by selectively removing the radioactive contamination without removing desirable organic material which enriches the soil for subsequent plant growth. The method of the invention results in a leachate solution which is amenable to further treatment and reuse.

The contamination of soils, ores or other materials with radioactive species, such as uranium, radium, and thorium, is a common environmental problem. In a great number of cases, the radioactive contamination is distributed throughout various fractions routinely found in soil, including gravel, sands, clays and silt, vegetation, organic matter, and groundwater. Radioactive contaminants may be found in mining sites, radioactive processing facilities, and even residential areas. In all cases it is necessary to remove or clean up the soil or other material.

Two approaches typically are used to treat contaminated soil. The first approach involves methods for preventing or restricting the dispersion of the contamination to the immediate surroundings. However, the application of such methods is problematic, since any breakdown is likely to result in widespread leakage of contaminants to adjacent land and water areas by groundwater, and can have a deleterious effect on flora, fauna and humans.

The second approach involves methods for removing or destroying contamination from soil, also referred to as "cleaning" or "remediating" the soil. One suitable remediation technique involves excavating the contaminated soil and reburying it in another area. But, the practice of digging the soil up in one area only to bury it in another, is expensive and becoming less environmentally acceptable.

Other techniques have been developed for remediation on-site or elsewhere. For example, U.S. Pat. No. 4,783,253, issued to Ayres et al., describes a method for treating water insoluble contamination which uses a concurrent flow of water to float away lighter uncontaminated particles from heavier contaminated particles. The slurry of particles is dewatered using a spiral classifier, centrifuge, filter or the like.

Heavy metal contaminants, including radioactive species, can also be removed from soil by size separation techniques, such as tiltable tables, or concurrent flow size separation in a mineral jig. Size separation and leaching techniques are described in U.S. Pat. No. 5,045,240, issued to Skriba et al., U.S. Pat. No. 5,128,068, issued to Lahoda et al., and U.S. patent application Ser. No. 07/722,458, filed Jun. 27, 1991, in the name of Grant, et al.

Leaching methods and soil washing methods are also used to remove radioactive species from soils. The use of aqueous extracting solutions to treat contaminated soils is described in "Extractive Methods For Soil Decontamination; A General Survey and Review of Operational Treatment Installations," J. W. Assink, in *Contaminated Soil*, Edited by J. W. Assink, and W. J. Van Den Brink, pp. 655–667, 1986, Martinus Nijhoff Publishers. Such solutions usually contain only water. Alternatively, they can contain bases like sodium carbonate or sodium hydroxide, or strong mineral acids like hydrochloric acid and nitric acid, to aid in the extraction process. After soil treatment, the contaminated extracting fluids can be cleaned with any known physical, chemical or biological purification methods. For instance, coagulation, flocculation followed by sedimentation, or flotation may be used. Other suitable techniques include ion exchange, aerobic and anaerobic biological purification, electrolysis, and membrane filtration.

There are several limitations associated with the above mentioned techniques. Each of the methods described above strips the soil of valuable organic material like humus which is crucial for subsequent plant growth. Moreover, depending upon the treatment process used, the presence of soluble organics in the extracting solution may interfere with the subsequent removal of the radioactive contaminant from solution. In particular, the presence of organic matter reduces the capacity of ion exchange resins which typically are used to remove radioactive species from the extracting solution. In addition, such methods do not address treatment of fine vegetation, such as root hairs, which also are likely to be contaminated.

Another disadvantage of the above mentioned remediation methods is that they are not suitable for all types of soil. Loamy soil, clay, and peat sites are generally difficult to clean by extraction. Humus-like components, silt, and clay particles readily form relatively stable suspensions with the extraction liquid. This is especially true for aqueous extracting solutions having a high pH. If the contaminants are present in the extracting solution as separate small particles, it is often impossible to separate relatively clean soil particles from the contaminated particles and effluent.

What is needed is a simplified method of treating large volumes of materials of different types, and containing soluble portions of hazardous or radioactive waste, so as to segregate the clean from the contaminated material and to concentrate the contaminated material. In particular, the method should successfully remove the radioactive contaminants from different types of soil without removing desirable materials.

There is a further need for a system that can effectively recover the contaminants once they have been removed from the soil, requiring a minimal amount of equipment, chemicals, and which further allows for the processing of recovered contaminants, such as metals, or other salable minerals.

SUMMARY OF THE INVENTION

Accordingly, the present invention resides in a method for treating material contaminated with soluble radioactive species comprising the steps of:

a. providing contaminated soil;

b. introducing into said soil an aqueous extracting solution, said extracting solution having a pH greater than or equal to about 7.5;

c. segregating fine vegetation from said soil and extracting solution;

d. introducing into said soil an acid in an amount sufficient to lower the pH of the extracting solution;

e. separating said soil from said extracting solution; and f. removing said radioactive species from said extracting solution.

Generally, to meet the required remediation levels for radioactive contaminants like uranium and radium, it is necessary that the optimum extraction conditions be used. As FIG. 1 illustrates, increasing the pH of the extracting solution results in increased solubility of radioactive contaminants, in this case uranium, into the extracting solution (which is desirable). Thus, to maximize contaminant removal from contaminated soil, the pH of the extractant must be maintained relatively high. However, as illustrated in FIG. 2, as the pH of the extracting solution is increased to enhance contaminant removal, the solubilization and mobilization of natural organic (i.e., carbon based) materials like humus also increases (which is not desirable).

The novel method of the present invention selectively targets harmful, radioactive species for solubilization, dispersion, mobilization and removal from the soil, without concomitant removal of desirable organic material, such as humus and the like. Moreover, by using the novel methods of the invention, removal of contaminant from the extracting solution by ion exchange means occurs relatively unimpeded, that is, without any interference from humus and other organic materials, thereby permitting the extracting solution to be recycled.

This goal is achieved by the methods of the invention which are characterized by introducing into the contaminated soil an aqueous extracting solution, wherein the extracting solution has a pH greater than or equal to about 7.5, and is added in an amount sufficient to solubilize, mobilize, or disperse the radioactive species into solution. This step is followed by introducing into the soil an acid in an amount sufficient to lower the pH of the extracting solution, and to remove substantially all organic material from the extracting solution. The addition of acid results in the coagulation and/or precipitation of desirable organic material, including humus, thereby removing it from the extracting solution without precipitating the radioactive species, which remain substantially in solution. In carrying out the method of the invention, it is essential that the reduction in pH of the extracting solution be carried out prior to separation of the cleansed fine soil components (such as clays and silts) from the contaminated extractant. It has been found that the soil particles provide necessary adsorption sites which aid in the coagulation/precipitation of the organic matter.

In a preferred embodiment, this method uses a unique aqueous extracting solution comprising both sodium carbonate and potassium carbonate, or alternatively ammonium carbonate, which results in soil that readily settles, thereby overcoming the dispersion problems associated with other processes. Thus, using the method of the present invention, relatively clean soil particles are easily separated from the contaminated extraction solution. In addition, the use of ammonium carbonate results in added, readily available, nitrogen to the soil which in turn enhances the soil's capability to support new plant growth.

Another novel aspect of the invention is the treatment of contaminated soil in the presence of fine vegetation, like root hairs, which can contain unacceptable levels of contamination. Such fine vegetation contains contamination which is not readily solubilized or mobilized by an extracting solution. The method of the invention provides a step for separation and removal of the fine vegetation from the soil.

Thus, the methods of the invention provide systems which can be applied on-site or off-site, and which are capable of handling major amounts of soil or other material containing portions of hazardous or radioactive species, in an economical and energy efficient fashion. The methods of the invention effectively remediate contaminated soil in the presence of clay and silt particles, organic matter, and fine vegetation. Moreover, the methods of the invention result in enrichment of the cleansed soil to promote future plant growth, and the cleansing and recycling of extractant solutions.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
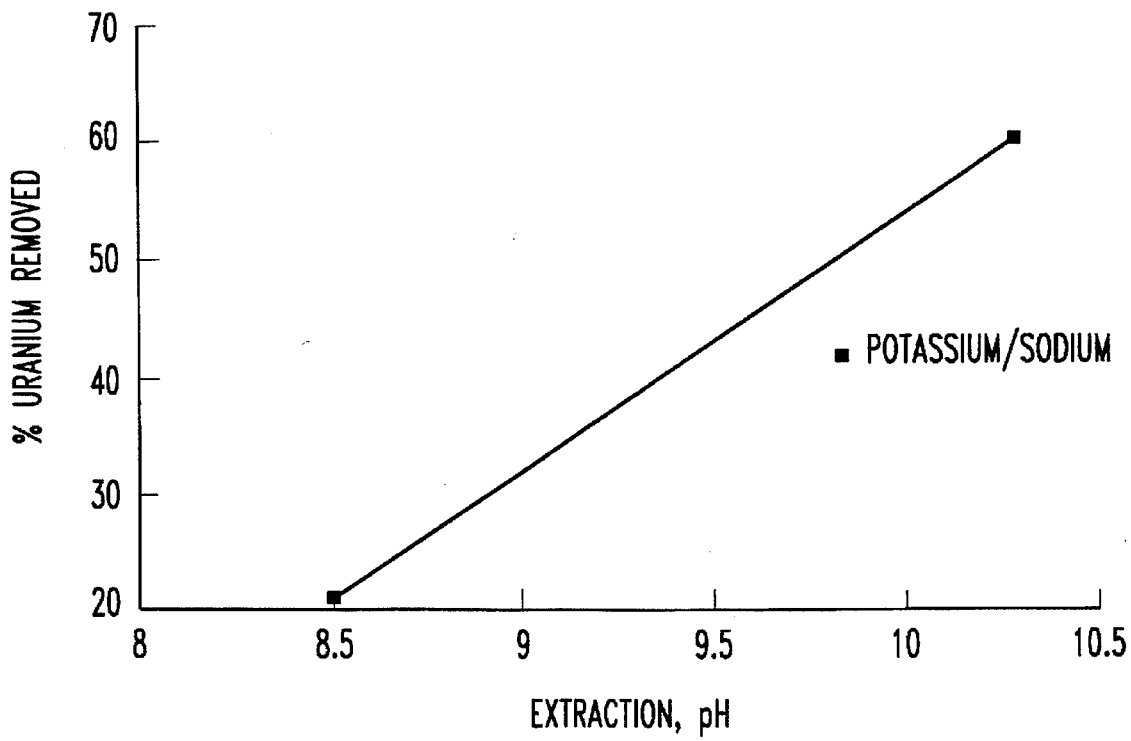
FIG. 1 is a graph demonstrating one advantage of the present invention; namely, illustrating the effect of increasing pH of the extracting solution on soil uranium level.
Figure 2:
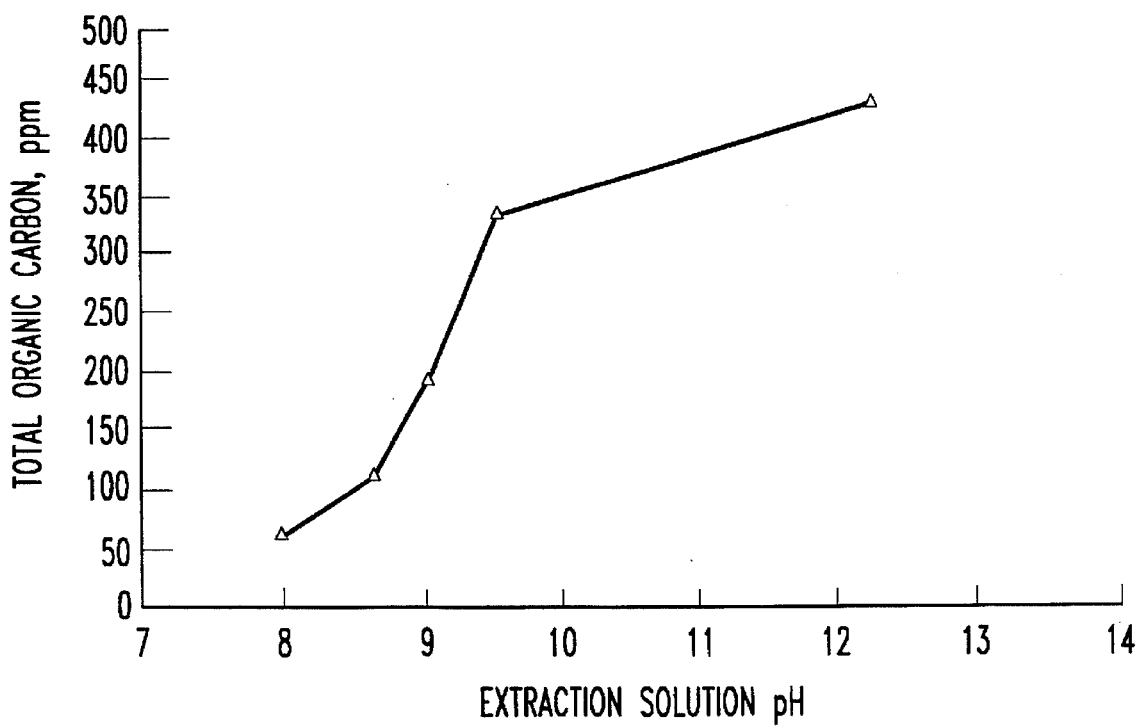
FIG. 2 is a graph illustrating the effect of increasing pH of the extracting solution on total organic carbon level of the soil.

The present invention is directed to methods for treating various types of particulate materials, and especially soil, which are contaminated with soluble radioactive species. While this process will be described primarily for removal of radioactive material, such as uranium, radium, cesium, cobalt, strontium, americium, thorium, plutonium, cerium, rubidium, and mixtures thereof, and the like, it also encompasses removal of other hazardous species such as copper, lead, or mercury in soluble form. This method can also be used to treat sludge, sediments, scrap yard dust, and the like.

As used herein, the term "soil" includes all forms of particulate matter to which contaminates may adhere, such as, for example, gravel, sands, clay, fines, sand, rock, humus, etc.

As used herein, the phrase "desirable organic material" includes all forms of organic matter which provides nutrients to the soil to promote plant growth, such as, for example, humus, humic acid, etc.

It is common for radioactive contamination to be present in a particular fraction or fractions of the soil in soluble form. For example, soluble cationic contaminants will exchange onto the negatively charged clay fraction of the soils. The soluble contamination is also likely to adsorb onto the humus fraction of the soil, and to be present in fine vegetation.

Although the method of the invention may be applied to soil particles of any size and having any composition, the method of the invention ideally is applied to pretreated portions of the contaminated soil, or contaminated process streams (i.e., extraction solutions used in removing contaminants from contaminated soil) containing small to fine soil particles (say less than about 1000 micrometers, preferably less than about 100 micrometers), clay and silt particles, organic matter like humus, and fine vegetation including root hairs and the like.

In a first embodiment of the invention, the material to be treated is excavated soil. Initially, the excavated soil is processed to remove large objects such as pieces of wood, vegetation, concrete, rocks and other debris, having diameters larger than about 150 mm (about 6 inches). Large objects may be removed by filtering the excavated soil through a sieve or a screen. These larger objects can be checked for contamination, and if necessary, washed with the contaminant extracting solution, rinsed with water, checked for residual contaminants, and returned to the site as a portion of the recovered soil. Alternatively, the large objects may be crushed and added to the smaller sized, contaminated soil. The soil then may be processed in a mechanical size separator, such as for instance a rotating drum or vibrating screen device, to sort and prewash the feed soil with a contaminant extracting solution. The intermediate to smaller soil particles and contaminated effluent can then be treated/separated in any number of ways. For example, the intermediate particles may be separated from the smaller particles and the fines using a screen, or sieve, or other size separation techniques. The intermediate pieces of soil then may be washed with the contaminant extracting solution, rinsed with water, checked for residual contaminants, and returned to the site as recovered soil. Alternatively, the intermediate to smaller soil particles and effluent can be processed in a countercurrent flow size separator such as a mineral jig, abraded in an attrition scrubber which dislodges mineral slime or fines from them, and then rinsed in a second concurrent flow size separator.

Suitable soil pretreatment methods are described in U.S. Pat. Nos. 5,045,240, issued Sep. 3, 1991 in the name of Skriba et al., 5,128,068, issued Jul. 7, 1992 in the name of Lahoda et al., U.S. patent application Ser. No. 648,673, filed Jan. 31, 1991, in the name of Lahoda et al., and U.S. patent application Ser. No. 722,458, filed Jun. 27, 1991, in the name of Grant et al., the disclosures of which are incorporated herein in their entirety.

Next, the soil cleansed by the pretreatment process (preferably containing intermediate to small particles) and the contaminated effluent are separated. The cleansed soil undergoes subsequent washing with clean extracting agent and/or water to remove as much of the contaminated extraction fluid as possible, and then may be checked again for contamination. The radioactive contaminants, smaller soil particles (say less than about 100 micrometers) and fines, clay and silt particles, fine vegetation, and the soluble components of the soil are generally carried off with the effluent, and will be treated using the novel methods of the invention.

The soil (typically a slurry mixture as described above) is mixed with an aqueous extracting solution which will transfer the radioactive contaminants to the extracting solution, either as particles or as a solute. The solution used to wash the soil will be dependent upon the contamination to be removed. For soluble contaminants, the solution will contain an extracting (i.e., leaching) agent. Many suitable extracting agents are known and common extracting agents suitable for leaching radioactive compounds include, for example, potassium carbonate, potassium bicarbonate, sodium carbonate, sodium bicarbonate, sodium chloride, acetic acid, sodium hypochloride, ammonium carbonate, ammonium bicarbonate, and others. One preferred extracting solution of the invention comprises a mixture of potassium carbonate and sodium carbonate. Another preferred extracting solution comprises ammonium carbonate. Depending upon the pH of the extracting solution, suitable carbonate extracting agents exist in bicarbonate form. Accordingly, as used herein, the term "carbonate" includes bicarbonate forms of the extracting agents. Carbonates of sodium and potassium are preferred over ammonium when the introduction of an unnatural cation (i.e., a cation that is not native to the soil) like ammonium may not be permitted. Aqueous solutions of the preferred compositions effectively remove uranium and surprisingly, even radium, to environmentally acceptable levels. For example, radium levels of between 5 and 15 picocuries per gram of soil may be achieved, depending upon the depth of the soil.

The extracting solution should have a pH and be added in an amount sufficient to solubilize, disperse, and/or mobilize at least about 10%, preferably at least about 20%, more preferably at least about 30%, even more preferably at least about 40%, and most preferably at least about 50% by weight, of said contaminate into solution. Accordingly, depending upon the properties and make-up of the soil to be treated, the extracting solution should have a pH greater than or equal to about 7.5, preferably greater than or equal to about 8, more preferably greater than or equal to about 8.5, even more preferably greater than or equal to about 9, and most preferably greater than or equal to about 9.5. The extracting solution also can have a pH greater than or equal to about 10. As indicated in FIG. 1, the pH of the extracting solution can be adjusted to achieve the desired amount of contaminant removal. For solutions of sodium and potassium carbonate, or ammonium carbonate, the concentration of the solution should be about 0.001M or greater, preferably between about 0.01 and 0.02M.

Fine vegetation, and especially root hairs, adsorb unacceptable levels of contamination which is not readily solubilized, dispersed and/or mobilized by extracting solution. The methods of the invention require separating this contaminated fraction from the contaminated soil and effluent after treatment with the extracting solution. Separation may be accomplished using any method known in the art. In one preferred embodiment, the fine vegetation is floated and/or fluidized from the soil, and then gathered using any suitable means, such as, for example, a vibrating screen.

Once the radioactive species are sufficiently solubilized or dispersed into solution, the pH of the extraction solution then is lowered by the introduction of an acid. The acid is added in an amount sufficient to lower the pH of the extracting solution, and preferably to remove substantially all organic material from the extracting solution. It has been found that by lowering the pH of the extracting solution to less than or equal to about 10, preferably less than or equal to about 9, more preferably less than or equal to about 8, and even more preferably less than or equal to about 7, organic matter in general, and humus in particular, are substantially removed from the extracting solution by precipitation and/or coagulation, without substantially precipitating the contaminant. For reasons explained above, it is essential that the pH of the extracting solution be reduced prior to separation of the extracting solution from the washed soil.

It has been found that by using the methods of the invention less than 500 ppm of total organic carbon remains in the extracting solution, preferably less than 350, more preferably less than 250, even more preferably less than 150 ppm, and most preferably less than 100 ppm. Accordingly, the acid can be added in an amount to remove substantially all organic material from the extracting solution.

Acceptable acids include one or more mineral acids selected from the group consisting of hydrochloric acid, nitric acid, sulfuric acid, phosphoric acid, perchloric acid, carbonic acid, and mixtures thereof. Hydrochloric acid is especially preferred. Suitable acid concentrations can be readily determined by one skilled in the art. Highly concentrated acids are preferred.

In the next step of the invention, the soil is separated from the extracting solution using any suitable method known in the art. Preferably, in this step the soil is treated with a flocculent and/or a coagulant to precipitate or coagulate substantially all of the desirable organic material and the soil particles. Suitable flocculents and coagulants include for example, MAGNIFLOC 950N, supplied by American Cyanamid, of Wayne, N.J. Then the soil, including any precipitate and coagulant, are separated from the extracting solution using any appropriate means, such as, for example, filtration. The extracted, washed soil should be rinsed with clean water to remove substantially all residual traces of contaminant.

Figure 3:
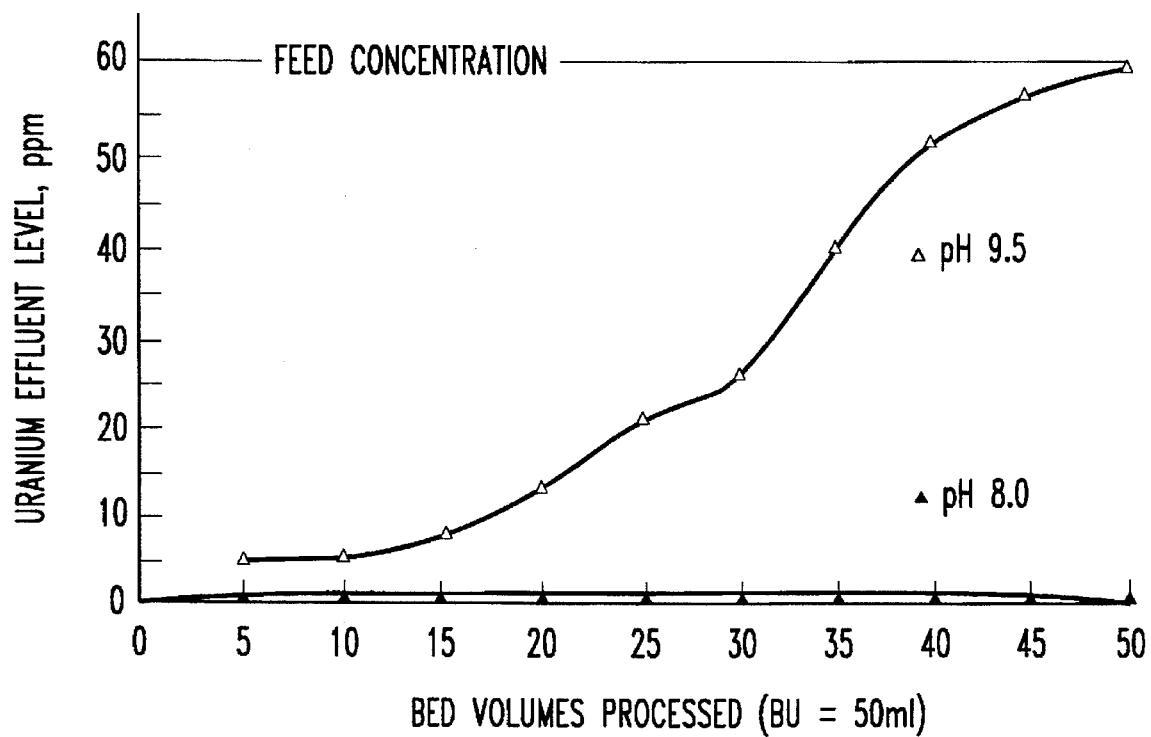
FIG. 3 is a graph demonstrating a second advantage of the present invention; namely, illustrating the increased uranium loading on ion exchange resin used to treat extracting solutions utilized according to the methods of the present invention.

For the soil remediation process to be cost effective, the solubilized, dispersed contaminant must be removed from the severely contaminated extracting solution to allow the extraction solution to be recycled. Accordingly, in the next step the contaminated extracting solution is cleaned, whereupon part or all of it is re-used.

Where the contaminants include radioactive compounds or heavy metals, the severely contaminated solution can be passed through an ion exchange bed to remove the soluble metals. This type of procedure is well known. Ion exchange beads or the like, usually synthetic organic polymers or natural zeolite particles, having diameters over about 300 micrometers (30 U.S. Screen No. Sieve Size), well known to attract the contaminants present, would attract and remove most of the solubilized radioactive contaminants. As FIG. 3 shows, the presence of organics generated at a pH of 9.5 reduces the capacity of the ion exchange resin to remove radioactive contaminants from the extraction solution, while at pH 8 the organics are sufficiently insoluble so as to not adversely affect the ion exchange process.

Depending upon the extraction solution and the form of contaminant, an anionic or cationic material may be used. Useful ion exchange materials include a strong acid cationic resin containing sulfonic functional groups with a styrene copolymer, and the like, for radium; and a strong base anionic resin containing quaternary ammonium functional groups with a styrene or styrene divinylbenzene copolymer, and the like, for uranium and thorium.

In place of an ion exchange column, a precipitator could be used as an ion removal apparatus. For example, the solution could be mixed with ferric hydroxide, barium sulfate, or the like, to precipitate or co-precipitate radium or thorium, or with hydroxide to precipitate thorium or uranium, or with peroxide to precipitate uranium. Other ion exchange or precipitation materials could be used depending on the hazardous or radioactive material involved. For example, other adsorption media such as zeolites or treated clays may also be used to remove the contaminants.

The ability to accomplish soil remediation using the methods of the invention is demonstrated in the following example.

EXAMPLE

Soil containing unacceptable levels of uranium and radium was washed using a 0.2M ammonium bicarbonate solution at a pH between 8.5 and 9.5. The excavated soil, which contained up to 40 weight percent clay, was contacted with the extractant for up to 1 minute. Up to 60 weight percent of the contamination was removed by the extractant.

Root hairs, which were found to contain high levels of insoluble contamination (up to 400 ppm uranium and 20 pCi/g radium), were segregated from the soil/extracting solution mixture. The pH of the solution was then lowered to less than pH 8 using concentrated HCl. The clean soil was separated from the contaminated extractant by settling, filtration, and rinsing. The extractant solution was then successfully treated by ion exchange, and reused. The clean soil was capable of supporting plant growth.

From the above, it can be seen that the invention provides a simple, yet highly effective method for treating soil contaminated with radioactive species. The method of the invention can be carried out on-site or off-site using any of the soil cleaning methods described herein.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:
1. A method for treating material contaminated with soluble radioactive species comprising the steps of:
   a. providing contaminated soil;
   b. introducing into said soil an aqueous extracting solution, said extracting solution having a pH greater than or equal to about 7.5;
   c. segregating fine vegetation from said soil;
   d. introducing into said soil an acid in an amount sufficient to lower the pH of the extracting solution;
   e. separating said soil from said extracting solution; and
   f. removing said radioactive species from said extracting solution.

2. The method of claim 1 wherein said material to be treated contains at least one soluble radioactive species selected from the group consisting of uranium, radium, cesium, cobalt, strontium, americium, thorium, plutonium, cerium, rubidium and mixtures thereof.

3. The method of claim 1 wherein said radioactive species is uranium, radium, or a mixture thereof.

4. The method of claim 1 wherein step (a) comprises providing contaminated soil comprising soil particles, clay and silt particles, humus and fine vegetation.

5. The method of claim 1 wherein step (b) comprises introducing an aqueous extracting solution comprising sodium carbonate and potassium carbonate, or ammonium carbonate.

6. The method of claim 1 wherein said extracting solution has a pH greater than or equal to about 8.

7. The method of claim 6 wherein said pH is greater than or equal to about 8.5.

8. The method of claim 6 wherein said pH is greater than or equal to about 9.

9. The method of claim 1 wherein step (b) comprises introducing an aqueous extracting solution consisting essentially of sodium carbonate and potassium carbonate.

10. The method of claim 1 wherein step (b) comprises introducing an aqueous extracting solution consisting essentially of ammonium carbonate.

11. The method of claim 1 wherein step (c) comprises the steps of:
   i. floating and/or fluidizing said fine vegetation from said soil; and
   ii. gathering said vegetation.

12. The method of claim 1 wherein step (d) comprises introducing at least one acid selected from the group consisting of hydrochloric acid, nitric acid, sulfuric acid, perchloric acid, or a mixture thereof.

13. The method of claim 12 wherein said acid is hydrochloric acid.

14. The method of claim 1 wherein said acid is added in an amount sufficient to remove substantially all organic material from said extracting solution.

15. The method of claim 1 wherein said acid is added in an amount sufficient to lower the pH of the extracting solution to less than or equal to about 7.

16. The method of claim 1 wherein said acid is added in an amount sufficient to lower the pH of the extracting solution to less than or equal to about 7.5.

17. The method of claim 1 wherein said acid is added in an amount sufficient to lower the pH of the extracting solution to less than or equal to about 8.

18. The method of claim 1 wherein said acid is added in an amount sufficient to lower the pH of the extracting solution to less than or equal to about 8.5.

19. The method of claim 1 wherein said acid is added in an amount sufficient to lower the pH of the extracting solution to less than or equal to about 9.

20. The method of claim 1 wherein step (e) comprises the further steps of:
   i. treating said soil with a flocculent and/or a coagulant to coagulate substantially all of organic material and said soil, and
   ii. then segregating said coagulant from said extracting solution by settling, centrifugation, and/or filtration.

21. The method of claim 1 wherein step (f) comprises removing said radioactive species from said extracting solution by at least one means selected from ion exchange, precipitation, and zeolitic adsorption.

22. A method for remediating soil contaminated with uranium, or radium, or a mixture thereof, comprising the steps of:
   a. providing contaminated soil;
   b. introducing into said soil an aqueous extracting solution comprising sodium carbonate and potassium carbonate, or ammonium carbonate, said extracting solution having a pH and being added in an amount sufficient to solubilize, mobilize or disperse at least about 10% by weight of said contaminate into solution;
   c. segregating contaminated fine vegetation from said soil;
   d. introducing into said extracting solution a mineral acid, said mineral acid being added in an amount sufficient to remove substantially all organic material from said extracting solution;
   e. separating clean soil from said extracting solution; and
   f. removing said radioactive species from said extracting solution.

23. The method of claim 22 wherein step (b) comprises introducing into said soil an aqueous extracting solution having a pH greater than or equal to about 7.5.

24. The method of claim 23 wherein said pH is greater than or equal to about 8.

25. The method of claim 23 wherein said pH is greater than or equal to about 8.5.

26. The method of claim 23 wherein said pH is greater than or equal to about 9.

27. The method of claim 23 wherein said pH is greater than or equal to about 9.5.

28. The method of claim 23 wherein said pH is greater than or equal to about 10.

29. The method of claim 22 wherein step (d) comprises introducing said mineral acid in an amount sufficient to lower the pH of said extracting solution to equal to or less than about 7.

30. The method of claim 22 wherein said mineral acid is added in an amount sufficient to lower the pH to equal to or less than about 7.5.

31. The method of claim 22 wherein said mineral acid is added in an amount sufficient to lower the pH to equal to or less than about 8.

32. The method of claim 22 wherein said mineral acid is added in an amount sufficient to lower the pH to equal to or less than about 8.5.

33. The method of claim 22 wherein said mineral acid is added in an amount sufficient to lower the pH to equal to or less than about 9.

34. The method of claim 22 wherein said mineral acid is added in an amount sufficient to lower the pH to equal to or less than about 10.

35. A method for treating material contaminated with soluble radioactive species comprising the steps of:
   a. providing a contaminated process stream used in removing contaminants from contaminated soil, said process stream comprising soil particles, clay and silt particles, humus and fine vegetation;
   b. introducing into said process stream an aqueous extracting solution comprising sodium carbonate and potassium carbonate, or ammonium carbonate, said extracting solution having a pH greater or equal to about 7.5;
   c. segregating contaminated vegetation from said process stream;
   d. introducing into said process stream a mineral acid in an amount sufficient to lower the pH of the extracting solution;
   e. separating clean particulate material from said process stream;
   f. removing said radioactive species from said process stream.

* * * * *